(No Model.)  2 Sheets—Sheet 1.
F. E. DUCKHAM.
GRAIN CONVEYER.
No. 528,418. Patented Oct. 30, 1894.
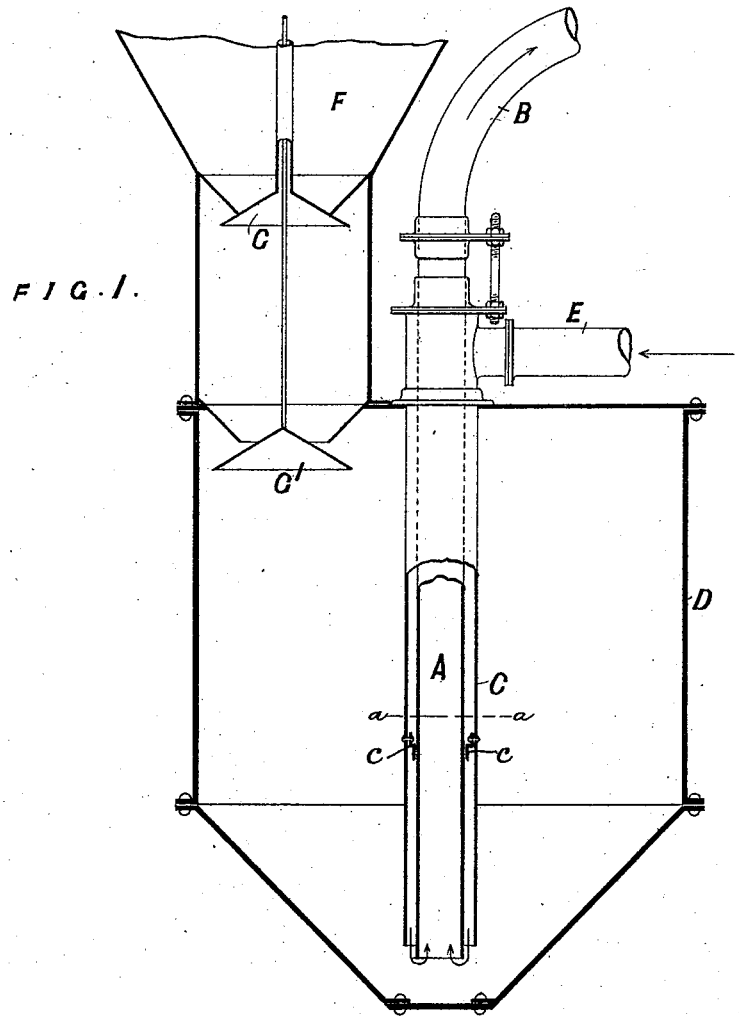
FIG. 1.
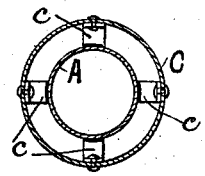
FIG. 1ᴮ
WITNESSES.
C. Sedgwick
J. W. Annaford
INVENTOR:
F. E. Duckham
BY
Munn & Co
ATTORNEYS

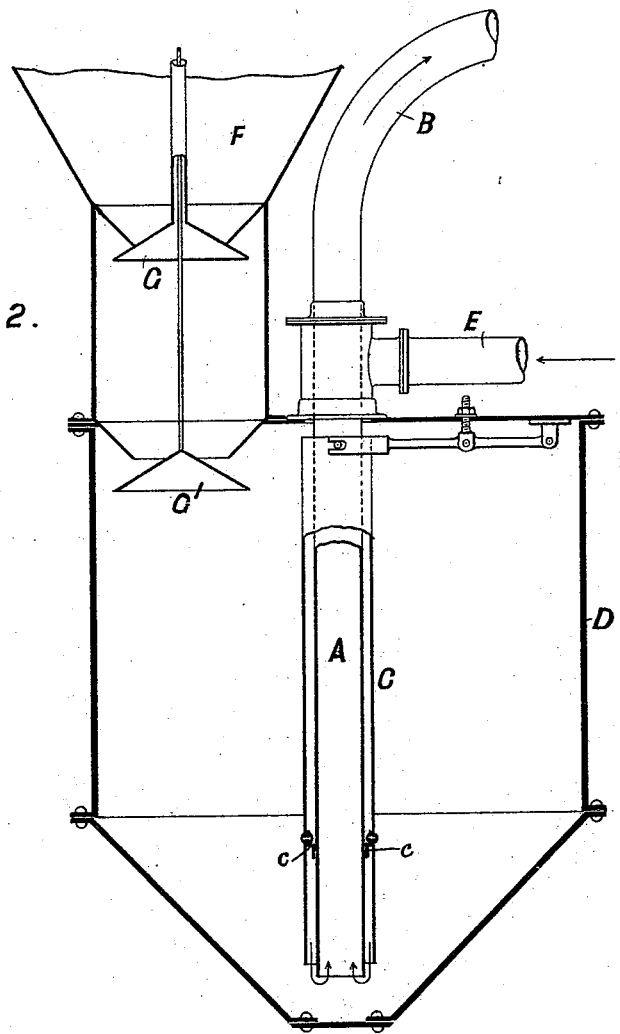

UNITED STATES PATENT OFFICE.

FREDERIC ELIOT DUCKHAM, OF LONDON, ENGLAND.

GRAIN-CONVEYER.

SPECIFICATION forming part of Letters Patent No. 528,418, dated October 30, 1894.

Application filed January 30, 1894. Serial No. 498,483. (No model.)

*To all whom it may concern:*

Be it known that I, FREDERIC ELIOT DUCKHAM, civil engineer, of Millwall Docks, London, England, have invented a new and useful Pneumatic Grain-Conveyer, of which the following is a full, clear, and exact description.

This invention relates to improved apparatus for elevating and conveying grain and other granular or pulverulent matters by a current of compressed air, and it consists of the combination, with an exit nozzle having its mouth opening downward, of a surrounding air blast sleeve in communication at its upper end directly or indirectly with a compressed air supply pipe from an air compressor, and of an inclosing chamber within which the nozzle and sleeve are immersed in the midst of a mass of grain, &c., to be elevated, said chamber being provided with an air lock or equivalent means of charging it with grain, &c., without permitting the escape of air.

Reference is to be had to the accompanying drawings, forming part of this specification, wherein—

Figures 1 and 2 illustrate in vertical section two slightly modified forms of the apparatus. Fig. 1ª is a cross section on line $a—a$ of Fig. 1.

The same letters of reference indicate the same parts in all the figures.

A is the exit nozzle having its mouth directed downward, the nozzle leading upward in a more or less vertical direction and being connected to a conveying pipe B leading to the place where the grain, &c., is to be conveyed and delivered.

C is the blast injecting sleeve.

D is a closed chamber wherein the nozzle A and sleeve C are contained, their mouths being situated at a short distance above the bottom of said chamber and wherein they are immersed in a mass of grain, &c., charged therein from a hopper F communicating with said chamber through any suitable form of air lock such as the independently-operated valves G G' and intermediate chamber whereby to enable the grain, &c., to be fed in without allowing air to escape.

E is the blast supply pipe connected to a blowing engine or air compressor. In Fig. 1 this pipe E is directly connected to the sleeve C which is closed at its upper end while in Fig. 2 the supply pipe E leads into the space at the upper part of the chamber D into which the upper end of the sleeve C opens above the level of the grain in the chamber D so as to be in communication with pipe E through the said upper part of the chamber D. Brackets or angle plates, *c*, are interposed between the nozzle and sleeve (as shown in Fig. 1ª) to hold them properly spaced apart and yet permit a sliding movement. In each case the sleeve C terminates at such a height above the lower end of the nozzle A that the grain, &c., will constantly flow by gravity beneath the end of the sleeve and directly into the path of the air blast passing from the sleeve to the exit nozzle A so that the grain, &c., must be carried along with and by the air which can only escape through the nozzle by carrying the grain along with it. The depth of the grain, &c., thus directly interposed in the path of the blast is determined by the height at which the sleeve terminates above the mouth of the nozzle A which depends upon the angle of repose of the grain or other matters to be conveyed (which angle varies for different matters or for the same matters under different physical conditions) and on the amount of air pressure used, and other variable conditions of working. The relative height of the lower end of the sleeve and of the mouth of the nozzle A is accordingly varied by making the one adjustable with regard to the other by means of adjusting screws and nuts, as shown, or equivalent means.

In either case the height of the mass of grain, &c., above the point of application of the blast need only be sufficient to insure a constant flow of the grain, &c., by gravity into the path of the blast, since in Fig. 1 any air which may percolate through the mass will establish an equilibrium of pressure at the upper and lower parts of the chamber D while in Fig 2 this equilibrium is established by the air being supplied to the upper part of chamber D and thence to the sleeve.

I claim—

1. In apparatus for the pneumatic elevation and conveyance of grain and other matters by compressed air, the combination with a closed chamber provided with an air lock, charging device, and with an air-blast supply pipe from an air compressor, of an exit nozzle within said chamber having its mouth downwardly directed near the bottom of said chamber, and of a surrounding air-blast sleeve open at its lower end at such a height above the mouth of the exit nozzle as to permit of the grain or other matters in which both sleeve and nozzle are immersed, flowing by gravity beneath the sleeve so as to be interposed directly into the path of the air blast passing to the nozzle the exit nozzle leading upwardly from said chamber and being connected to a conveying pipe, the blast sleeve being closed at the upper end connected with the blast supply pipe and the sleeve and nozzle being relatively adjustable as to height, substantially as and for the purpose specified.

2. In apparatus for the pneumatic elevation and conveyance of grain and other matters by compressed air, the combination with a closed chamber provided with an air lock charging device, and with an air blast supply pipe from an air compressor, of an exit nozzle within said chamber having its mouth downwardly directed near the bottom of said chamber, and of a surrounding air blast sleeve open at its lower end at such a height above the mouth of the exit nozzle as to permit the grain or other matters in which both sleeve and nozzle are immersed flowing by gravity beneath the sleeve so as to be interposed directly into the path of the air blast passing to the nozzle, the exit nozzle leading upwardly from said chamber and being connected to a conveying pipe, the blast sleeve being open at its upper end to the interior of the closed chamber to which the air blast supply pipe is connected, and the sleeve and nozzle being relatively adjustable as to height, substantially as and for the purpose specified.

FREDERIC ELIOT DUCKHAM.

In presence of—
   THOMAS LAKE,
17 *Gracechurch Street, London, Notary's Clerk.*
   W. M. HARRIS,
17 *Gracechurch Street, London, Notary Public.*